Nov. 28, 1961 — A. ZEITLIN ET AL — 3,011,043
HEATING MEANS FOR SPECIMENS SUBJECTED TO ULTRA-HIGH PRESSURE
Filed July 27, 1960 — 2 Sheets-Sheet 1

INVENTORS.
ALEXANDER ZEITLIN,
GEORGE GERARD &
BY JACOB BRAYMAN their ATTORNEYS.

Nov. 28, 1961   A. ZEITLIN ET AL   3,011,043
HEATING MEANS FOR SPECIMENS SUBJECTED TO ULTRA-HIGH PRESSURE
Filed July 27, 1960   2 Sheets-Sheet 2

INVENTORS.
ALEXANDER ZEITLIN,
GEORGE GERARD &
BY JACOB BRAYMAN their   ATTORNEYS.

United States Patent Office 3,011,043
Patented Nov. 28, 1961

3,011,043
HEATING MEANS FOR SPECIMENS SUBJECTED TO ULTRA-HIGH PRESSURE
Alexander Zeitlin, White Plains, George Gerard, Yonkers, and Jacob Brayman, Staten Island, N.Y., assignors to Engineering Supervision Company, New York, N.Y., a corporation of New York
Filed July 27, 1960, Ser. No. 45,571
8 Claims. (Cl. 219—50)

This invention relates to test bodies used in multi-anvil, ultra-high pressure apparatus of the type disclosed in co-pending applications Serial Nos. 785,690 (Gerard et al.), 804,546 (Zeitlin et al.) now Patent No. 2,968,837, filed January 8, 1959 and April 6, 1959, respectively, and assigned to the assignee of the present application. More particularly, this application relates to means for obtaining improved heating within such test bodies during compression thereof in such multi-anvil apparatus.

A test body of the sort referred to includes as one element a specimen of material to be subjected to pressure. The character of the specimen is not critical. Thus, for example, the specimen may be a rigid body (as, say, a shaft or other mechanical part) or, alternatively, it may be a mass of loose particles enclosed in a sample tube or otherwise held together within the test body.

The specimen (and sample tube, if any) is surrounded by pressure-transmitting material forming another element of the test body. The last-named material is of such nature that, under relatively low pressure, the material becomes plastic to subject the specimen to a uniform hydrostatic pressure field. Examples of pressure-transmitting materials which are commonly used are silver chloride and, the natural mineral, pyrophyllite.

As a preliminary to a compressing operation, the test body is placed in the center of the multiple anvil apparatus so as to be surrounded by anvils which are separated from each other by small gaps permitting the anvils to undergo simultaneous movements towards the center of the test body. During the compressing operation itself, the anvils all so move to exert pressure from all sides on the pressure-transmitting material of the test body. Some of this material responds to such pressure to flow into the gaps between the anvils to there act as a gasket. The rest of the pressure-transmitting material becomes plastic to communicate the pressure exerted on the test body to the central specimen therewithin. In this manner, the mentioned specimen may be subjected to pressures of 100,000 atmospheres or more.

In many instances, it is desirable that, when the specimen is subjected to high pressure, it simultaneously be subjected to high temperature. This high temperature is ordinarily produced by heating the specimen with current introduced into the test body through suitable leads passing from the exterior of the test body through the pressure-transmitting material. Because of limitations on the size of the leads which can be used, and, also, perhaps for other considerations (such as the size of the current generating equipment available), there is an upper limit to the amount of heating current which can be passed through the test body.

As exemplified by the article appearing on pages 445–449 of the August 29, 1958 issue of Science, the generally known practice of the prior art has been to convert the electrical energy of the current into heat energy by passing the current in a straight line path through a conductive sample tube imbedded in the pressure-transmitting material of the test body and containing the specimen material thereof. Because of the geometry of the multi-anvil apparatus employed, the current path afforded by the sample tube has necessarily been one having a relatively low ratio of length to cross-sectional area for a given volume of material in the path. We have found that, for this reason among others, the electrical-to-heat energy conversion provided by the current path for a given input current has been less efficient than it might be. Furthermore, because of limitations placed upon the efficiency of conversion by the character of the current path, there may result any one or more of the following: (1) a limiting of the maximum temperature level which can be sustained for a given size specimen with a given amount of current, (2) a slowing down of the rate at which a given size specimen is raised by a given amount of current to a particular temperature, or (3) a limiting of the mass of the specimen which can be sustained at a particular temperature by a given amount of current.

It is, accordingly, an object of our invention to provide ways and means for overcoming the above-noted disadvantages.

Another object of our invention is to provide through a test body for super high pressure, multi-anvil apparatus a current path or paths which are of a character to improve the efficiency of electrical-to-heat energy conversion taking place in the path or paths for any given input current.

Still another object of our invention is to provide through the test body a current path or paths of the above-described character which are adapted for heating specimens of diverse sorts.

These and other objects are realized according to the invention in a manner as follows. We have discovered that, in a current path which is used for heating a specimen and which has a given volume equal to the product of the length of the path and of its cross-sectional area (which is assumed to be the same over the entire path length), the rate at which heat is generated by the path from a given current input can be greatly increased by suitably increasing the length of the path while maintaining the volume thereof constant by appropriately diminishing the cross-sectional area of the path. As later set out in more detail, the exact theoretical relationship between the length of a path of given volume and the rate at which heat is generated by such path from a given current input is that the rate of heat generation will vary in proportion to the square of the path length.

One way of increasing the rate of heat generation is to employ a specimen of, say, prismatic or cylindrical shape which is elongated in the dimension of its principal axis relative to the cross-sectional dimensions thereof, and to have the path for current either through the specimen material itself (when a good conductor) or, alternatively, through a conducting sheath surrounding the specimen and extending over the length thereof. A current path which is so provided will be a straight line path, but, because of its elongation in length, the volume of material in the path will provide a greater heating effect for a given current input than will a straight line current path of the same volume but of shorter length and of greater cross-sectional area. As applied to straight line current paths, however, while the elongation of the path at the expense of its cross-section can be readily effected with multi-anvil apparatus of the type to be described in this application, it cannot be effected in test bodies usable in the multi-anvil pressure apparatus taught in the mentioned Science article and wherein the test body is in the form of a regular tetrahedron. The reason is that the geometry of the tetrahedral test body does not permit the accommodation therein of specimens which are both elongated and of reasonable volume relative to the volume of the test body compressed by the anvils of the apparatus.

Another way of employing our discovery is to increase the length within a test body of a current path of given volume by providing in the overall length of the path at least one turn which renders such length greater than the continuous extent of the path in any straight line direction. In this connection, what is meant by such a "continuous extent" is that, if the overall length of the path is considered traversed from one given end to the other by a point always moving towards that other end, and if such moving point is normally projected onto a straight line which runs one way in the given direction and the other way in opposite direction, then, as the movement of the point produces corresponding movement of the projection thereof over the mentioned line, the whole of each distance moved by such projection over that line in the given direction without an intervening reversal of direction is the distance of a continuous extent of the current path in that straight line direction. This mode of increasing the length of the current path is independent of the exterior shape of the test body and thus can be practiced where the test body is a regular polyhedron (or otherwise is non-elongated) as well as where it has an elongated shape.

Preferably, the current path has more than one turn. The configuration of such turns is not critical, and, thus, the path may be in the form of, say, a spiral, a helix, or a convoluted path of any shape whatever so long as the overall length of the path exceeds any continuous extent thereof in any straight line direction. In order, however, to maximize the length of the path relative to the volume of space by which the path is contained, we have found it convenient to make the one or more turns of a form which may be described as a bending of the path back upon itself. By this is meant that the courses of the path to either side of a considered turn are of a length exceeding the greatest width between those courses. Examples of configurations wherein the path is so bent back upon itself are those in which the path has, say, one or more hairpin bends, or in which the shape of the path corresponds to a sinusoidal curve wherein the separation between the hill and valley peaks of the curve is greater than the separation between adjacent hill peaks or between adjacent valley peaks.

As a further measure for maximizing the length of the path relative to the volume of space required to contain it, the path may have a plurality of turns which are formed to arrange the courses of the path included within or between those turns in a disposition of single path thickness. Thus, for example, such courses may be arranged in a flat disposition of single path thickness, or in a closed tubular disposition of single path thickness, or, say, in an open disposition of single path thickness and whose curvature is somewhere between flat and closed tubular.

When the geometry of the test body permits, a further maximization of path length can be obtained by arranging the courses of the path in a three dimensional disposition wherein, say, a number of such dispositions of single path thickness are superposed with each other, and wherein the lengths of the path in those individual dispositions are joined by turns of the path to render it a single, continuous path throughout.

A current path of the sort described may be provided in various ways to suit the character of the specimen to be heated. For example, if the specimen is a rigid impenetrable body which is relatively non-conductive of current, the current path may be formed to envelop the specimen body while being embedded in the pressure-transmitting material which surrounds that body. If the specimen is comprised of a mass of material in loose particle form, advantage may be taken of the incoherence of the particles to form the mass of the specimen into a shape within the test body which is the same as that desired for the current path itself. When such is done, a factor determining the means by which the current path is provided is the degree of conductivity of the specimen material. To wit, if such material is a good conductor, that material of itself may be used to provide the current path. On the other hand, if the specimen material is a poor conductor, the current path is better provided by a conductive sheath surrounding the shaped specimen material or by a conductor running through the center of the shaped specimen material. The sheath is preferred to the central conductor. As another alternative, in the instance where the specimen material is not electro-conductive and is of loose particle form, the mass of the specimen material need not be shaped to conform to the configuration of the current path to be used. Instead, the mass of specimen material may be present as a compact body surrounded by pressure-transmitting material, and the current path may be provided, in this instance, by a conductor which runs back and forth through the penetrable body of specimen material.

The invention hereof will be described in connection with the multi-anvil apparatus disclosed in the mentioned copending patent application Serial No. 785,690. For a better understanding of such invention and of the apparatus in which such invention is employed, reference is made to the following description and to the accompanying drawings wherein.

Figure 1:
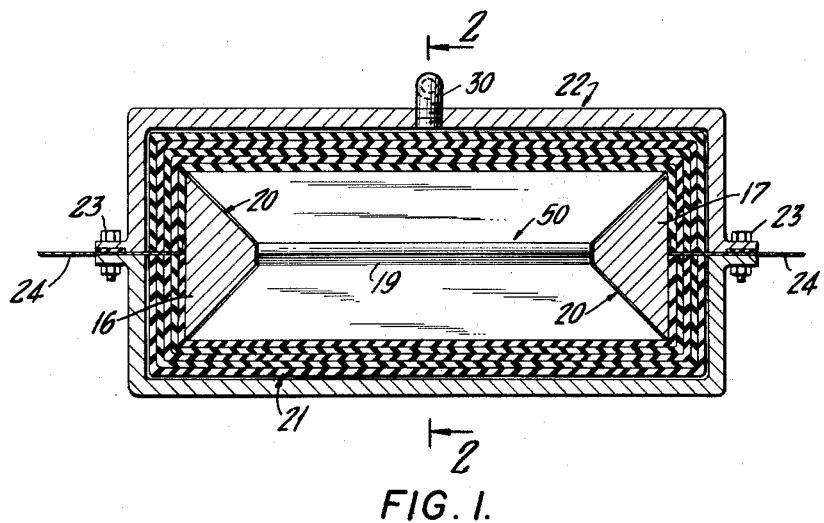
FIG. 1 is a view in longitudinal section through a slightly modified form of the multi-anvil apparatus disclosed in the said patent application Serial No. 785,690.
Figure 2:
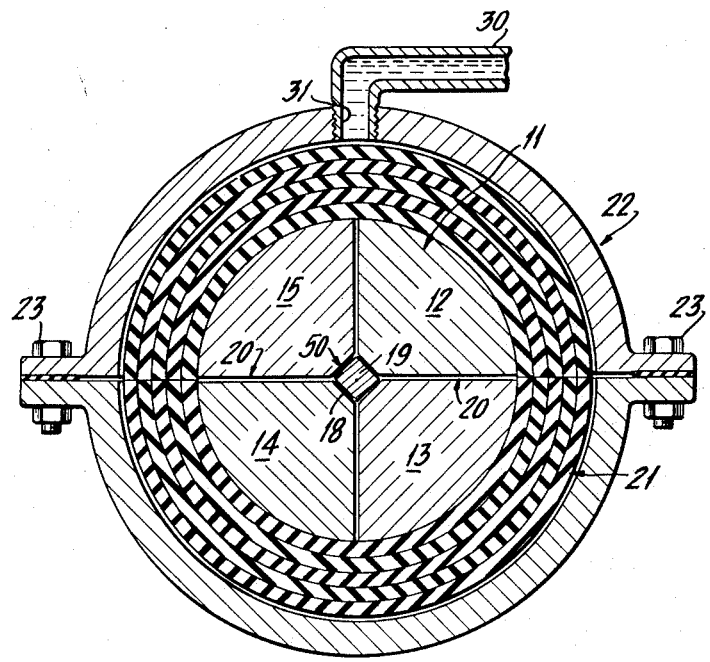
FIG. 2 is a cross-sectional view of the apparatus of FIG. 1 taken on lines 2—2 and looking in the direction of the arrows.
Figure 2A:
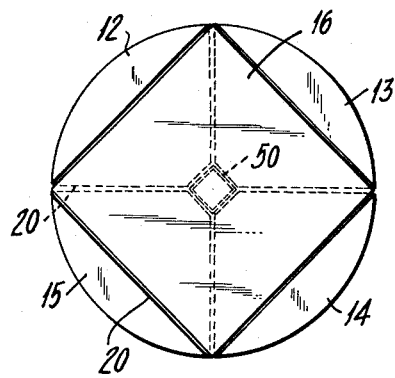
FIG. 2A is an end view of the anvil assembly employed in the FIG. 1 apparatus.

Referring now to FIGS. 1 and 2, the apparatus shown therein includes a cylindrical pressure multiplying member 11 comprising six wedge-shaped segments 12—17 having inner surfaces forming a prismatic cavity 18 which is of square cross section. This cavity contains the prismatic test body 50 to be later described in detail. The segments 12—17 are made of any suitable material such as cemented tungsten carbide, for example, which is capable of withstanding extreme pressures without substantial deformation or disintegration. Of the segments 12—17 the peripheral segments 12—15 are generally in the shape of cylindrical segments having chamfered planar faces at their ends, and having an inner planar face in the shape of an elongated rectangle. The end segments 16, 17 are of different shape than the peripheral segments, viz. the end segments are in the form of truncated square pyramids. All of the wedge segments 12—17 are separated from each other by narrow gaps 20 which permit the segments to move inwardly to compress the test body 50.

Surrounding the pressure-multiplying member 11 is a pressure-transmitting closure member 21 of, say, rubber. The entire assembly of member 11 and member 21 is enclosed in a close fitting metal housing 22 of high strength. If desired, the closure member 21 and the housing 22 may each be made in two parts which are separably joined as by bolts 23 or other suitable means to provide easy access to the member 11. In order to provide a heating effect while applying pressure, two electrical conductors 24 are carried in through the housing 22 and the closure member 21 and are joined to the wedge segments 16 and 17 at opposite ends of the member 11.

In order to apply pressure to the closure member 21, pressurized hydraulic fluid is flowed through a conduit 30 and an aperture 31 into the interspace formed between the inside of the housing 22 and the outside of the pressure-transmitting closure member 21. The pressure of the hydraulic fluid in this interspace is communicated through the closure member 21 to drive all of the segments 12—17 simultaneously in the inward direction to thereby render the test body 50 compressed on all sides by those segments. At the same time, the pressure of the hydraulic fluid acts to drive together the separate halves of the closure member 21 to thereby preclude hydraulic fluid from leaking through the interface between those halves and, from thence, into the wedge segment assembly. For further details of the apparatus which has been described, reference is made to the disclosure of the mentioned copending application Serial No. 785,690.

Figure 3:
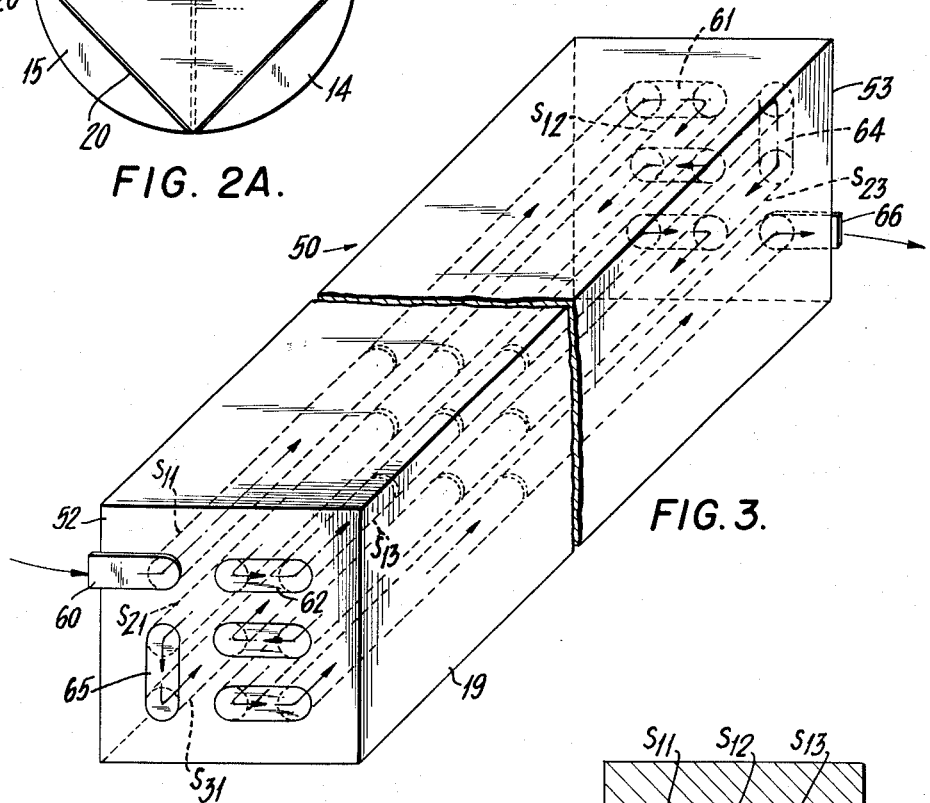
FIG. 3 is an isometric view of the test body employed in the FIG. 1 apparatus.
Figure 4:
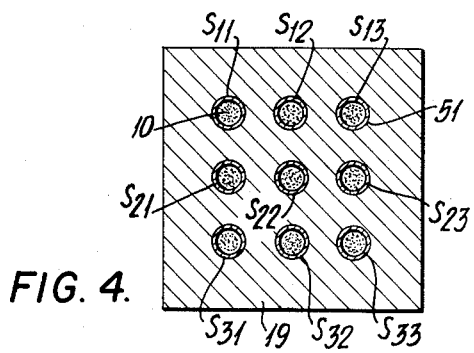
FIG. 4 is a view taken in axial cross-section of the test body shown in FIG. 3.

Turning now to a consideration of the improved test body 50, as illustrated in FIGS. 3 and 4, one of the components of this test body is an elongated block 19 of a suitable pressure-transmitting material (as, say, pyrophyllite) which acts electrically as an insulator and, also, thermally as an insulator. For the particular test body shown, the block 19 has the shape of an elongated prism of square cross-section to match the shape of the cavity 18 defined by the inner faces of the particularly described multi-anvil apparatus. However, if the shape of the cavity 18 permits, the block of pressure-transmitting material may have a cross-section corresponding to a circle or other closed curve (so that the block is prismatic in the sense in which that term is applied to all bodies having a peripheral surface defined by self-parallel movement of a line about a closed path). Further, and again, if the shape of the cavity 18 permits, the mentioned block need not be of prismatic shape, and it need not necessarily be elongated.

To the end of containing specimen material within the block 19, such block has formed therein a plurality of circular holes 51 which run parallel to the principal axis of the block, and which traverse the block from its one end face 52 to its other end face 53. The parallel nature of the holes 51 adds considerably to the convenience and simplicity of constructing the multi-turn current path to be described. Altogether, nine holes 51 are so formed and are arranged (FIG. 4) in an array of rows and columns in a plane normal to the principal axis of the block 19.

The holes 51 act as receptacles within block 19 for a plurality of tubular sheath members $S_{11}$—$S_{33}$ of which each is inserted into a respective one of the holes 51 to run from one end face to the other of the block 19. Each of those sheath members S is composed of a material which is conductive of electrical current but which has sufficient resistance to provide a good heating effect when current is passed therethrough. Suitable materials for such purpose are, say, graphite, tungsten, and in some instances, stainless steel. The sheath members S are designated in a manner wherein the row and column occupied by any one member are designated by, respectively, the first and second digits of the suffix number in the designation for that member. Thus, the sheath member $S_{21}$ is that one which is located in the second row from the top and the first column from the left.

Each of the sheath members S contains specimen material 10 which is in the form of loose particles packed into the sheath member from end to end thereof. In the shown test body, conductive sheaths are employed around the specimen material for the reason that the specimen material is assumed to be a poor conductor of electric current. If, however, the specimen material happens to be a good conductor, then the conductive sheaths can be omitted altogether so that the holes 51 are filled entirely by the specimen material 10 or, alternatively, non-conductive sheaths can be used if a sheath of some sort is desirable to separate the specimen material from the pressure-transmitting material of the block 19.

The various sheaths S are serially connected in a single current path by means as follows. A current is fed from the end wedge segment 16 of the multi-anvil apparatus (FIG. 1) to the test body 50 (FIGS. 3 and 4) by a resilient conducting tab 60 whose free end is against the wedge segment 16. The anchored end of tab 50 is connected to the termination of sheath $S_{11}$ which is at the end face 52 of block 19. The other termination of sheath $S_{11}$ is at end face 53. At this other termination, $S_{11}$ is electrically connected through a conducting "jumper" tab 61 to the termination at the same end face 53 of the sheath member $S_{12}$. In like manner the second and third sheaths $S_{12}$ and $S_{13}$ of the top row are electrically connected together at the end face 52 by a jumper tab 62. Thus, all three sheath members $S_{11}$, $S_{12}$, $S_{13}$ of the top row are serially connected together to form a length of current path having an areally extended disposition of single path thickness.

In each of the other rows of the sheath array, all of the sheath members constituting a given row are likewise serially connected by horizontally running jumper tabs in the manner shown by FIG. 3.

The length of current path corresponding to the top row of the array is serially connected to the length of current path corresponding to the middle row thereof by a vertically running jumper tab 64 which extends between the terminations at end face 53 of the righthand sheath member $S_{13}$ of the top row and of the righthand sheath member $S_{23}$ of the middle row. Similarly, the length of path corresponding to the middle row is serially connected to the length of path corresponding to the bottom row by a vertically running jumper tab 65 extending between the terminations at end face 52 of the lefthand sheath member $S_{21}$ of the middle row and the termination at the same end face of the lefthand sheath member $S_{31}$ of the bottom row. The righthand sheath member $S_{33}$ of the bottom row has connected to its termination at end face 53 a conducting lead-out tab 66 which is resilient to press with its free end against the end wedge segment 17 (FIG. 1) of the multi-anvil apparatus. In this manner, a single continuous path is established for flow of current from an outside current source through the test body 50. Evidently, the means for conducting current through the apparatus to the test body proper consists, at one end, of the input conductor 24, the wedge segment 16 and the resilient lead-in tab 60, and, at the other end, of the resilient lead-out tab 66, the wedge segment 17 and the lead-out conductor 24.

From the foregoing description, the operations performed on the test body should be self-evident but will be described briefly. Shortly after a compressing operation begins, electric current is passed through the described current path of the test body 50 to be converted into heat by the resistive material of which the sheath members S are formed. This heat is, of course, communicated to the specimen material 10 within the sheath members S to raise the temperature of the specimen during a sufficient period of time to impart the desired degree of heating to the specimen, the wedge segments of the multi-anvil apparatus meanwhile maintaining pressure from all sides on the pressure-transmitting material forming the block 19 of the test body. As previously described, some of this pressure-transmitting material flows into the gaps 20 between the wedge segments to there act as a gasket. The remainder of the pressure-transmitting material becomes plastic (i.e., somewhat viscous) to communicate the pressure exerted on the exterior of block 19 to the sheath members S and, through those sheath members, to the specimen material 10. The combination of the high pressure and high temperature conditions to which the specimen material is simultaneously subjected creates for such material an environment which is conducive to the production in such material of changes of solid state which potentially are of commercial importance.

The current path shown in FIG. 3 is evidently of much greater length and much smaller cross-sectional area than the current path which would be provided by, say, a single cylindrical heating sheath which contains the same volume of the same resistance material as the described path, but which is designed to fit into a test body having, say, the form of a regular tetrahedron whose total volume is the same as that of the described prismatic test body 50. Some part of the relative increase in length of the described current path is, of course, attributable to the elongation of the test body 50, whereby, for a given volume of such body, it is adapted to contain a longer single straight line extent of current path than it could if it were of tetrahedral form. The greater part, however, of the relative increase in length of the described current path is attributable to the large number of turns provided in the path from one end to the other of its overall length.

We have previously pointed out, without explanation, that a redistribution of a given volume of resistive material in a current path so as to increase the length of the path at the expense of its cross sectional area is a technique which permits a significant increase in the heating effect derived from flow in the path of a given value of current. We have further pointed out that, in theory, and for a given volume of material in the current path, the relationship between the rate of heat generation and the path length is that the former varies directly with the square of the latter. The mathematics of why this is so will now be set forth.

Assuming that what is sought is maximization of the temperature T of the specimen, such temperature T is a function of the rate U at which heat energy is supplied to a given volume of the specimen, or, in other words:

$$T = f(U) \qquad (1)$$

The rate U of heat flow is, in turn, nothing but a manifestation in another energy form of the rate at which electrical energy is dissipated in the current path. Thus, we can write the equation $$U = I \cdot e = I^2 \cdot R \qquad (2)$$

where R is the total electrical resistance of all the conducting sheath portions of the path (or the total resistance of the specimen material itself if such material is used instead of the sheaths to provide the current path).

Assuming now that the current path is of constant cross-sectional area $a$ throughout its length L the volume V of resistive material in the current path is given by the expression:

$$V = L \cdot a \qquad (3)$$

From this it follows that the total resistance R of the path is given by:

$$R = \frac{zL}{a} = \frac{zL^2}{V} \qquad (4)$$

where $z$ is the specific resistance of the current path material.

From the foregoing, it is seen that a specified current I produces a rate of heat flow which is given by the expression:

$$U = I^2 \frac{zL^2}{V} = \frac{I^2 zL}{a} \qquad (5)$$

The last expression demonstrates mathematically what has been previously stated, namely, that for a current path of given volume, the rate of heat flow developed by a given current input will vary directly as the square of the length of the current path.

Considering further the last expression, the relationship set forth therein suggests that the rate of heat flow could also be increased by increasing the value of current input I or by increasing the specific resistance z of the path material. As a practical matter, however, the size of the required leads (and, perhaps, other factors) limits the maximum current I which can be used. Also, as a practical matter, a wide choice is not available for the specific resistance z. Thus, the described lengthening of the current path provides the most convenient means for increasing the heating effect obtained in super high pressure test bodies.

Apart from the advantage of a better electrical-to-thermal energy conversion provided by a current path whose length has been elongated at the expense of its cross-sectional area, such path provides certain thermal advantages as follows. First, because of the lesser cross-sectional area of the specimen, the material thereof is heated more rapidly and more evenly throughout than would be the case for a specimen of normal cross-sectional area. Second, although the rate of heat flow to the specimen is greater with an elongated path than with a normal path (because of the better energy conversion), the rate of heat loss to the pressure-transmitting material need not be more (and may be even less) for the elongated path in the instance where it has a three dimensional configuration of which one example is that configuration shown in FIG. 3. The reason why this is so is that the heat which is permanently lost to the pressure-transmitting material is mostly lost by outward radiation from the courses of the elongated current path at the periphery of its three-dimensional configuration, and, for such courses, the total area which is effective to radiate heat outwardly may be less than or no more than the outward radiating area of a non-elongated path.

The above-described embodiments being exemplary only, it will be understood that the invention hereof comprehends embodiments differing in form and/or detail from those specifically disclosed. For example, as indicated previously, in the FIG. 3 embodiment the current path may be mostly through the specimen material itself in the instance where such material is a good conductor and, where the enclosing sheaths are formed of a relatively non-conductive material. Further, while only one current path has been spoken of, it is evident that the invention is of application in the instance where there is employed more than one current path which is elongated as described.

Accordingly, the invention is not to be considered as limited save as is consonant with the scope of the following claims.

We claim:

1. A test body adapted to be placed in the cavity of a press having pressure-multiplying anvils so as to be compressed by said anvils, said test body comprising, a casing of pressure-transmitting material adapted under pressure to become plastic so as to have created therein a hydrostatic pressure field, a specimen disposed in said casing and constituted of material to be subjected to heat and pressure, a plurality of electroconductor sections disposed in said casing adjacent to and outside of said specimen material to heat it by passage through said sections of electric current, and means connecting said sections in series to form for said current an electroconductive path which is elongated lengthwise and which has in its overall length at least one turn which renders said length greater than any continuous extent of said path in a straight line direction.

2. A test body adapted to be placed in the cavity of a press having pressure-multiplying anvils so as to be compressed by said anvils, said test body comprising, a casing of pressure-transmitting material adapted under pressure to become plastic so as to have created therein a hydrostatic pressure field, a plurality of mutually spaced bodies of specimen material embedded in said casing to each intersect a common plane through said casing, a plurality of electroconductor sections each disposed in said casing adjacent to and outside a respective one of said bodies to heat it by passage through such section of electric current, and means connecting said sections in series to form for said current an electroconductive path which is elongated lengthwise and which has in its overall length at least one turn which renders said length greater than any continuous extent of said path in a straight line direction.

3. A test body adapted to be placed in the cavity of a press having pressure-multiplying anvils so as to be compressed by said anvils, said test body comprising, a casing of pressure-transmitting material adapted under pressure to become plastic so as to have created therein a hydrostatic pressure field, a plurality of mutually spaced bodies of specimen material embedded in said casing to each intersect a common plane through said casing, a plurality of electroconductive heating sheaths of which each encloses a respective one of said bodies and is adapted to heat it by passage of electric current through such sheath, and means connecting said sheaths in series to form for said current an electroconductive path which is elongated lengthwise and which has in its overall length at least one turn which renders said length greater than any continuous extent of said path in a straight line direction.

4. A test body adapted to be placed in the cavity of a press having pressure-multiplying anvils so as to be compressed by said anvils, said test body comprising, a casing of pressure-transmitting material adapted under pressure to become plastic so as to have created therein a hydrostatic pressure field, a specimen in said casing of material to be subjected to heat and pressure, a plurality of electroconductor sections disposed in said casing adjacent said specimen to heat it by passage through said sections of electric current, and further disposed in said casing to each intersect a common plane therethrough and to have a two-dimensional distribution in said plane, and means connecting said sections in series to form for said current an electroconductive path which is elongated lengthwise and which has in its overall length a plurality of turns which render said length greater than any continuous extent of said path in a straight line direction.

5. A test body adapted to be placed in the cavity of a press having pressure-multiplying anvils so as to be compressed by said anvils, said test body comprising, a block of pressure-transmitting material adapted under pressure to become plastic so as to have created therein a hydrostatic pressure field, said block having formed therein a plurality of holes of which each extends between opposite ends of said block to have a termination at each such end, a plurality of bodies of specimen material of which each is disposed in a respective one of said holes, a plurality of electroconductor sections of which each is disposed in a respective one of said holes adjacent the specimen material therein to heat such material by passage of electric current through such section, and a plurality of electrical connectors of which at least one is disposed at each of said block ends, each such connector extending at the block end adjacent thereto outside said block between two terminations, respective at such end to that connector, of two of said holes, and such connector extending also from one to the other of the two electroconductor sections in those two holes, said connectors connecting said plurality of sections in series to form for said current an electroconductive path which is elongated lengthwise and which has in its overall length a plurality of turns which render said length greater than any continuous extent of said path in a straight line direction.

6. A test body adapted to be placed in the cavity of a press having pressure-multiplying anvils so as to be compressed by said anvils, said test body comprising, a block of pressure-transmitting material adapted under pressure to become plastic so as to have created therein a hydrostatic pressure field, said block having formed therein a plurality of holes of which each extends between opposite ends of said block to have a termination at each such end, a plurality of bodies of specimen material of which each is disposed in a respective one of said holes, a plurality of electroconductive heating sheaths of which each is disposed in a respective one of said holes to enclose the specimen material therein so as to heat such material by passage of electric current through such sheath, and a plurality of electrical connectors of which at least one is disposed at each of said block ends, each such connector extending at the block end adjacent thereto outside said block between two terminations, respective at such end to that connector, of two of said holes, and such connector extending also from one to the others of the two sheaths in those two holes, said connectors connecting said plurality of sheaths in series to form for said current an electroconductive path which is elongated lengthwise and which has in its overall length a plurality of turns which render said length greater than any continuous extent of said path in a straight line direction.

7. A test body adapted to be placed in the cavity of a press having pressure-multiplying anvils so as to be compressed by said anvils, said test body comprising, a block of pressure-transmitting material adapted under pressure to become plastic so as to have created therein a hydrostatic pressure field, said block having formed therein a plurality of holes of which each extends between opposite ends of said block to have a termination at each such end, and which have a two-dimensional distribution in said casing in a plane normal to a line between said ends, a plurality of bodies of specimen material of which each is disposed in a respective one of said holes, a plurality of electroconductor sections of which each is disposed in a respective one of said holes adjacent the specimen material therein to heat it by passage of electric current through such section, and a plurality of electrical connectors of which at least one is disposed at each of said block ends, each such connector extending at the block end adjacent thereto outside said block between two terminations, respective at such end to that connector, of two of said holes, and such connector extending also from one to the other of the two sections in those two holes, said connectors connecting said plurality of sections in series to form for said current an electro-conductive path which is elongated lengthwise and which has in its overall length a plurality of turns which render said length greater than any continuous extent of said path in a straight line direction.

8. A test body adapted to be placed in the cavity of a press having pressure-multiplying anvils so as to be compressed by said anvils, said test body comprising, a block of pressure-transmitting material adapted under pressure to become plastic so as to have a hydrostatic pressure field created therein, said block having formed therein a plurality of holes of which each extends between opposite ends of said block to have a termination at each such end, and which have a two-dimensional distribution in said casing in a plane normal to a line between said ends, a plurality of bodies of specimen material of which each is disposed in a respective one of said holes, a plurality of electroconductive heating sheaths of which each is disposed in a respective one of said holes to enclose the specimen material therein so as to heat such material by passage of electric current through such sheath, and a plurality of electrical connectors of which at least one is disposed at each of said block ends, each such connector extending at the block end adjacent thereto outside said block between two terminations, respective at such end to that connector, of two of said holes, and such connector extending also from one to the other of two sheaths in those two holes, said connectors connecting said plurality of sheaths in series to form for said current an electroconductive path which is elongated lengthwise and which has in its overall length a plurality of turns which render said length greater than any continuous extent of said path in a straight line direction.

References Cited in the file of this patent

UNITED STATES PATENTS

| | | |
|---|---|---|
| 2,566,921 | Briscoe | Sept. 4, 1951 |
| 2,585,818 | Moravec | Feb. 12, 1952 |
| 2,717,300 | Tyne | Sept. 6, 1955 |
| 2,945,083 | Ganske | July 12, 1960 |